(12) United States Patent
Hoffmann

(10) Patent No.: US 10,555,214 B2
(45) Date of Patent: Feb. 4, 2020

(54) COEXISTENCE OF SOFTWARE DEFINED NETWORK, NETWORK FUNCTION VIRTUALIZATION AND LEGACY NETWORKS

(71) Applicant: NOKIA SOLUTIONS AND NETWORKS GMBH & CO. KG, Munich (DE)

(72) Inventor: Klaus Hoffmann, Munich (DE)

(73) Assignee: NOKIA SOLUTIONS AND NETWORKS GMBH & CO. KG, Munich (DE)

( * ) Notice: Subject to any disclaimer, the term of this patent is extended or adjusted under 35 U.S.C. 154(b) by 0 days.

(21) Appl. No.: 15/559,903

(22) PCT Filed: Feb. 17, 2016

(86) PCT No.: PCT/EP2016/053364
§ 371 (c)(1),
(2) Date: Sep. 20, 2017

(87) PCT Pub. No.: WO2016/150623
PCT Pub. Date: Sep. 29, 2016

(65) Prior Publication Data
US 2018/0098246 A1 Apr. 5, 2018

(30) Foreign Application Priority Data
Mar. 20, 2015 (WO) ................ PCT/EP2015/055940

(51) Int. Cl.
*H04W 28/08* (2009.01)
*H04W 24/02* (2009.01)
(Continued)

(52) U.S. Cl.
CPC ............ *H04W 28/08* (2013.01); *H04L 45/64* (2013.01); *H04L 67/16* (2013.01); *H04W 24/02* (2013.01);
(Continued)

(58) Field of Classification Search
CPC ..... H04W 28/08; H04W 28/10; H04W 36/22; H04W 24/02; H04W 36/385;
(Continued)

(56) References Cited

FOREIGN PATENT DOCUMENTS

| WO | WO 2014/202151 A1 | 12/2014 |
|---|---|---|
| WO | WO 2015/090363 A1 | 6/2015 |

(Continued)

OTHER PUBLICATIONS

International Search Report & Written Opinion dated May 2, 2016 corresponding to International Patent Application No. PCT/EP2016/053364.

(Continued)

*Primary Examiner* — Afshawn M Towfighi
(74) *Attorney, Agent, or Firm* — Squire Patton Boggs (US) LLP

(57) ABSTRACT

The present invention addresses method, apparatus and computer program product for enabling improved coexistence of Software Defined Network, Network Function Virtualization, and legacy networks. Thereby, information about characteristics of available core network nodes is obtained, it is determined, upon receiving a signaling request from a network node, which type of network node the signaling network node is, among at least a legacy network node, a virtualized network node and a software defined networking network node, and at least one network node to be used as gateway is selected from the available core network nodes, according to the determined type of signal- (Continued)

ing/originating network node and a policy set in advance for minimizing traffic load.

19 Claims, 5 Drawing Sheets

(51) Int. Cl.
| | | |
|---|---|---|
| H04L 12/715 | (2013.01) | |
| H04L 29/08 | (2006.01) | |
| H04W 28/10 | (2009.01) | |
| H04W 36/22 | (2009.01) | |
| H04W 28/02 | (2009.01) | |
| H04W 36/38 | (2009.01) | |

(52) U.S. Cl.
CPC .......... *H04W 28/10* (2013.01); *H04W 36/22* (2013.01); *H04W 28/0268* (2013.01); *H04W 36/385* (2013.01)

(58) Field of Classification Search
CPC .... H04W 28/0268; H04L 45/64; H04L 67/16; H04L 67/10
See application file for complete search history.

(56) References Cited

FOREIGN PATENT DOCUMENTS

| WO | WO 2015/090455 A1 | 6/2015 |
|---|---|---|
| WO | WO 2015/106822 A1 | 7/2015 |
| WO | WO 2015/172803 A1 | 11/2015 |

OTHER PUBLICATIONS

3GPP TS 23.251 V12.1.0 (Jun. 2014), Technical Specification, 3rd Generation Partnership Project; Technical Specification Group Services and System Aspects; Network Sharing; Architecture and functional description (Release 12), Jun. 2014.

3GPP TS 36304 V12.1.0 (Jun. 2014), Technical Specification, 3rd Generation Partnership Project; Technical Specification Group Radio Access Network; Evolved Universal Terrestrial Radio Access (E-UTRA); User Equipment (UE) procedures in idle mode (Release 12), Jun. 2014.

ETSI GS NFV-SWA 001 V1.1.1 (Dec. 2014), ETSI, Group Specification, Network Functions Virtualisation (NFV); Virtual Network Functions Architecture, Dec. 2014.

ETSI GS NFV: "ETSI GS NFV 001 V1.1.1 Network Functions Virtualisation (NFV); Use Cases," Oct. 1, 2013, pp. 1-50, XP055143758.

Margaret Chiosi et al., "Network Functions Virtualisation—An Introduction, Benefits, Enablers, Challenges & Call for Action," Contributing Organisations & Authors, Oct. 22, 2012, XP055091626, pp. 1-16.

3GPP TS 23A01 V125.0 (Jun. 2014), Technical Specification, 3rd Generation Partnership Project; Technical Specification Group Services and System Aspects; General Packet Radio Service (GPRS) enhancements for Evolved Universal Terrestrial Radio Access Network (E-UTRAN) access (Release 12), Jun. 2014.

3GPP TS 24.008 V12.6.0 (Jun. 2014), Technical Specification, 3rd Generation Partnership Project; Technical Specification Group Core Network and Terminals; Mobile radio interface Layer 3 specification; Core network protocols; Stage 3 (Release 12), Jun. 2014.

3GPP TS 36A13 V12.2.0 (Jun. 2014), Technical Specification, 3rd Generation Partnership Project; Technical Specification Group Radio Access Network; Evolved Universal Terrestrial Radio Access Network (E-UTRAN); S1 Application Protocol (S1AP) (Release 12), Jun. 2014.

3GPP TS 36.331 V12.2.0 (Jun. 2014), Technical Specification, 3rd Generation Partnership Project; Technical Specification Group Radio Access Network; Evolved Universal Terrestrial Radio Access (E-UTRA); Radio Resource Control (RRC); Protocol specification (Release 12), Jun. 2014.

ETSI GS NFV-MAN 001 V1.1.1 (Dec. 2014), ETSI Group Specification, Network Functions Virtualisation (NFV); Management and Orchestration, Dec. 2014.

COEXISTENCE OF SOFTWARE DEFINED NETWORK, NETWORK FUNCTION VIRTUALIZATION AND LEGACY NETWORKS

FIELD OF THE INVENTION

The present invention generally relates to wired or wireless communication networks, and more specifically relates to a method, apparatus and computer program product for enabling coexistence of Software Defined Network SDN, Network Function Virtualization NFV, and legacy networks.

BACKGROUND

Mobile data transmission and data services are constantly making progress, wherein such services provide various communication services, such as voice, video, packet data, messaging, broadcast, etc. In recent years, Long Term Evolution LTE™ has been specified, which uses the Evolved Universal Terrestrial Radio Access Network E-UTRAN as radio communication architecture according to 3GPP specification.

Today's mobile networks consist of dedicated nodes providing telecommunication services to end users. However, recently Network Function Virtualization NFV and Software Defined Network SDN solutions attract more and more the focus of network providers.

As is discussed e.g. in the ETSI NFV white paper (https://portal.etsi.org/nfv/nfv_white_paper.pdf), cloud infrastructures provide methods to enhance resource availability and usage by means of orchestration and management mechanisms, applicable to the automatic instantiation of virtual appliances in the network, to the management of resources by assigning virtual appliances to the correct CPU core, memory and interfaces, to the re-initialization of failed virtual machines (VM), to snapshot VM states and the migration of VMs.

At the core of these cloud technologies are virtualization mechanisms: hardware virtualization by means of hypervisors, as well as the usage of virtual Ethernet switches for connecting traffic between virtual machines and physical interfaces. For communication-oriented functions, high-performance packet processing is available through high-speed multi-core CPUs with high I/O bandwidth, the use of smart Ethernet Network Interface Cards (NICs) for load sharing and Transmission Control Protocol (TCP) Offloading, and routing packets directly to Virtual Machine memory, and poll-mode Ethernet drivers.

Generally, the NFV architecture requires that at least the user plane traffic is forwarded from the network to a data center DC, and after processing the packets are forwarded back to the network for further routing.

At the end, this leads to the fact that each virtualized function being placed in the DC creates a doubling traffic from the network router to the DC where the virtualized network function resides, and back to the network router, which creates significant costs for the operator.

Additionally, without intelligent network routing and application allocation the cost for the operator may also increase, which is not desired.

For instance, in case the evolved NodeB eNB (base station), serving gateway SGW and packet gateway PGW are virtualized in three different data centers DC, e.g. the user plane traffic is duplicated three times, i.e. every time for eNB, SGW and PGW separately.

However, for Software Defined Networks SDN this is not the case as the User plane traffic does not necessarily need to be carried to the DC.

Hence, an optimization of the interconnection between legacy nodes and future network architectures and even between future network architectures is required.

SUMMARY OF THE INVENTION

Therefore, in order to overcome the drawbacks of the prior art, it is an object underlying the present invention to provide such optimization of the interconnection between legacy nodes and future network architectures, specifically to allow improved coexistence of Software Defined Network, Network Function Virtualization and legacy networks.

In particular, it is an object of the present invention to provide a method, apparatus and computer program product for optimized coexistence of Software Defined Network, Network Function Virtualization and legacy networks.

According to a first aspect of the present invention, there is provided a method performed in a core network selection function, comprising obtaining information about characteristics of available core network nodes, determining, upon receiving a signaling request from a network node, which type of network node the signaling/originating network node is, among at least a legacy network node, a virtualized network node and a software defined networking network node, and selecting at least one core network node to be used as gateway from the available core network nodes, according to the determined type of signaling/originating network node and a policy set in advance for minimizing traffic load.

According to a second aspect of the present invention, there is provided an apparatus including a core network selection function, comprising at least one processor, and at least one memory for storing instructions to be executed by the processor, wherein the at least one memory and the instructions are configured to, with the at least one processor, cause the apparatus at least to perform obtaining information about characteristics of available core network nodes, determining, upon receiving a signaling request from a network node, which type of network node the signaling/originating network node is, among at least a legacy network node, a virtualized network node and a software defined networking network node, and selecting at least one core network node to be used as gateway from the available core network nodes, according to the determined type of signaling/originating network node and a policy set in advance for minimizing traffic load.

According to a third aspect of the present invention, there is provided a computer program product comprising computer-executable components which, when the program is run, are configured to carry out the method according to the first aspect.

Advantageous further developments or modifications of the aforementioned exemplary aspects of the present invention are set out in the dependent claims.

According to certain embodiments of the present invention, the characteristics of the available core network nodes comprise legacy type network nodes, virtualized type network nodes, and software defined networking based network nodes.

According to certain embodiments of the present invention, the signaling request may comprise an information element indicating the type of the signaling network node. The type of the signaling network node may be determined based on the information element. Thereby, the information element may comprise information regarding the geographic location of the signaling network node.

According to certain embodiments of the present invention, in case an information element indicating the type of the signaling network node is not received, it is assumed that the signaling network node is a legacy type network node.

According to certain embodiments of the present invention, in case the signaling network node is of the virtualized type, information including the name/ID of the cloud where the virtualized signaling network node or the control plane of the signaling network node is located is provided by the signaling network node. Thereby, said ID of the cloud may preferably be a global cloud ID.

Further, according to certain embodiments of the present invention, information regarding the type of signaling network node is provided via at least one of a global network orchestrator, the orchestrator of the network function virtualization, and by means of a database and or the HSS (Home Subscriber Server).

Further, according to certain embodiments of the present invention, in case the signaling network node is located at least partly in a cloud, a signaling partner is placed in or selected from the same cloud in order to minimize the additional transport impact due to forwarding payload traffic back and forth unnecessarily.

Further, according to certain embodiments of the present invention, in case the signaling network node is a legacy type network node or the signaling network node is decomposed into control plane and user plane, the user plane traffic is not transmitted into the cloud to a virtualized network function, but the payload is kept within a legacy type core network node or decomposed core network node on the network node user level.

Further, according to certain embodiments of the present invention, the at least one network node to be used as gateway is selected based on subscription information of the user in question. The selection may comprise selecting a legacy type packet network node or selecting a decomposed packet network node where the control plane is hosted in the cloud, but the user plane is located outside the cloud.

Moreover, according to certain embodiments of the present invention, the signaling network node is a base station, the at least one selected core network node acting as gateway is at least one of a serving gateway and packet gateway, and the core network selection function is located and/or performed in a mobility management entity.

Moreover, according to certain embodiments of the present invention, the signaling network node is a P-CSCF (Proxy-CSCF) and/or I-CSCF (Interrogating CSCF), the at least one selected core network node acting as gateway is at least one of a S-CSCF (Serving CSCF) and IBCF (Interconnection Border Control Function), and the core network selection function is performed in combined or not combined P-CSCF/DNS/HSS entity.

Moreover, according to certain embodiments of the present invention, the signaling network node is a S-CSCF (Serving-CSCF), the at least one selected core network node acting as gateway is at least one of a MGCF (Media Gateway Control Function), BGCF (Border Gateway Control Function), AS (Application Server), MRFC (Media Resource Function Control) and IBCF (Interconnection Border Control Function), and the core network selection function is located and/or performed in a combined or separated S-CSCF/DNS/HSS entity.

BRIEF DESCRIPTION OF DRAWINGS

For a more complete understanding of example embodiments of the present invention, reference is now made to the following descriptions taken in connection with the accompanying drawings in which.

DESCRIPTION OF EXEMPLARY EMBODIMENTS

Figure 1:
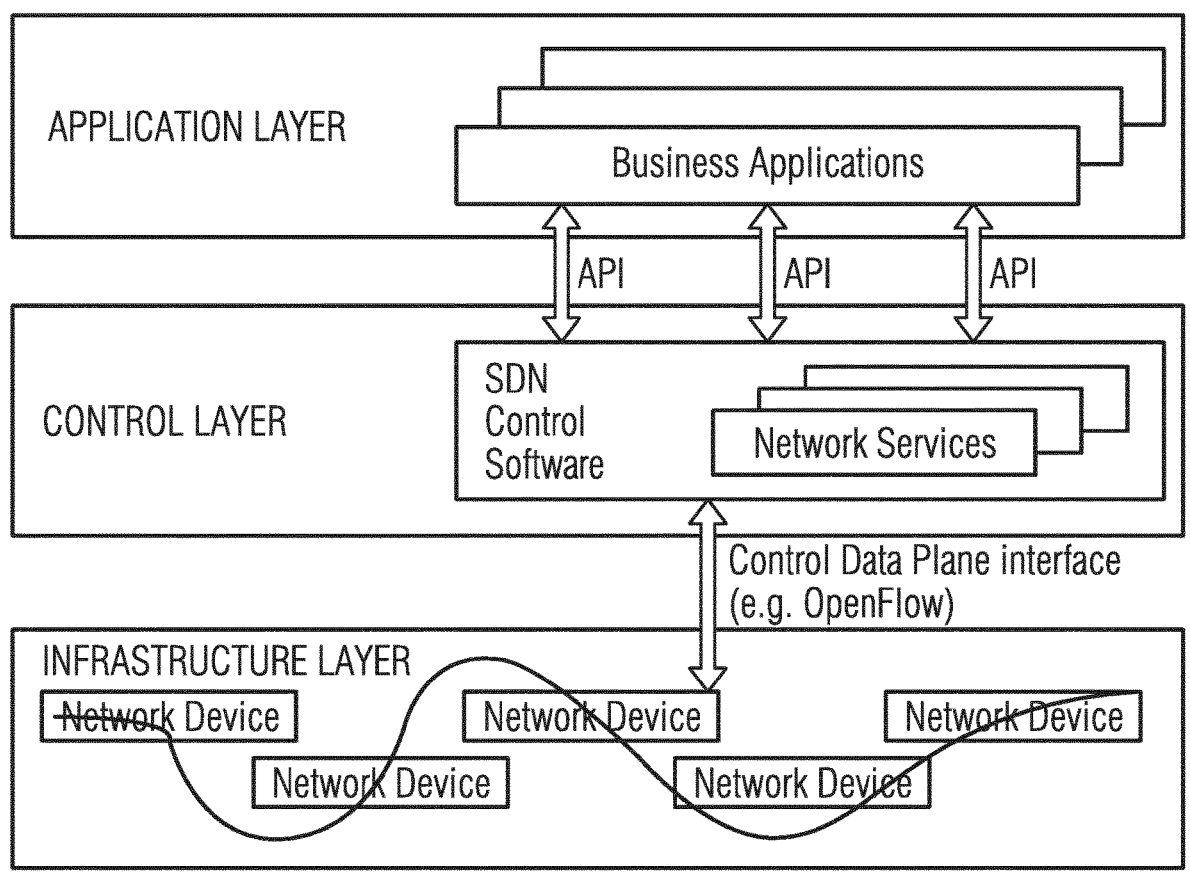
FIG. 1 indicates a general structure of a Software Defined Networking architecture according to the prior art.

Exemplary aspects of the present invention will be described herein below. More specifically, exemplary aspects of the present invention are described hereinafter with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

Some example versions of the disclosure and embodiments are described with reference to the drawings. In the following, different exemplifying examples will be described using, as an example of a communication network, a cellular wireless communication network, such as an LTE or LTE-Advanced based system as well as virtualization performed or a decomposition in accordance with SDN principle therein. However, it is to be noted that the present invention is not limited to an application using such types of communication system, but is also applicable in other types of communication systems, be it wireless systems, wired systems or systems using a combination thereof.

Hereinafter, various embodiments and implementations of the present invention and its aspects or embodiments are described using several alternatives. It is generally noted that, according to certain needs and constraints, all of the described alternatives may be provided alone or in any conceivable combination, also including combinations of individual features of the various alternatives.

In particular, the following examples versions and embodiments are to be understood only as illustrative examples. Although the specification may refer to "an", "one", or "some" example version(s) or embodiment(s) in several locations, this does not necessarily mean that each such reference is to the same example version(s) or embodiment(s), or that the feature only applies to a single example version or embodiment. Single features of different embodiments may also be combined to provide other embodiments. Furthermore, words "comprising" and "including" should be understood as not limiting the described embodiments to consist of only those features that have been mentioned and such example versions and embodiments may also contain also features, structures, units, modules etc. that have not been specifically mentioned.

In general, a telecommunication network comprises plural network elements, such as evolved NodeB's (eNB; i.e. base station in LTE environment), user equipments UE (e.g. mobile phone, smart phone, Computer, etc.), controllers, interfaces, etc, and in particular any equipment used in the provision of a telecommunications service.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from a base station and a communication network besides those described in detail herein below.

FIG. 1 indicates a general structure of a Software Defined Networking architecture according to the prior art, using e.g. Open Networking Foundation's 'OpenFlow'.

In an infrastructure layer several (virtualized) network devices are present, which are controlled via a control data plane interface (e.g. OpenFlow) by a SDN control software in a control layer, which provide network services. Application programming interfaces API connect business applications of an application layer with the control layer.

Figure 2:
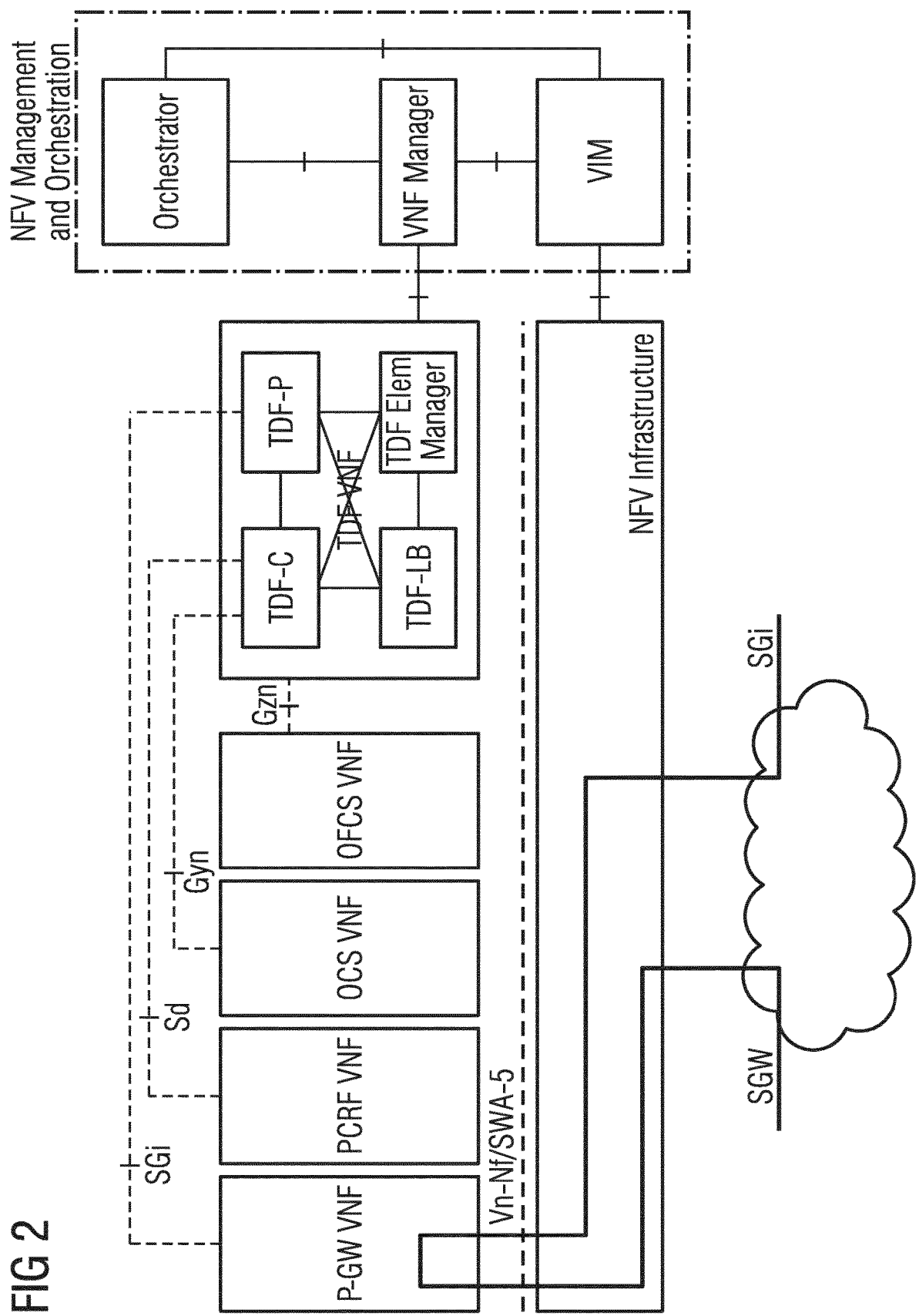
FIG. 2 schematically shows the placement of a virtualized network function, such as an integrated PGW within a cloud/data center according to the Network Function Virtualization known from the European Telecommunications Standards Institute ETSI.

That is, according to this SDN, the payload is carried within the network devices, however the network devices are controlled via the NB API and e.g. OpenFlow FIG. 2 schematically shows the placement of a virtualized network function, such as an integrated PGW within a cloud/data center according to the Network Function Virtualization known from the European Telecommunications Standards Institute ETSI (prior art).

In the drawing, the SGi is a reference point between the PGW and the Packet Data Network PDN. TDF (Traffic Detection Function) resides on this interface. From the vEPC (virtualized EPC (Evolved Packet Core)) perspective, TDF VNF communicates with PGW VNF (Virtualized Network Function) for User-Plane data transfer in both directions. The Sd reference point resides between the PCRF (Policy and Charging Rules Function) and the TDF. The Sd reference point enables a PCRF to have dynamic control over the application detection, enforcement and charging behavior at a TDF. The Gyn reference point resides between the OCS (Online Charging System) and the TDF. The Gyn reference point allows online credit control for charging. The Gzn reference point resides between the TDF and the OFCS (Offline Charging System). The Gzn reference point enables transport of offline charging information. All the interfaces described above are part of the existing 3GPP (third Generation Project Partnership) architecture.

Specifically, FIG. 2 shows the placement of the virtualized network function e.g the integrated PGW within the cloud/data center. Based on ETSI NVF MANO architecture the orchestrator, the VNFM (VNF Manager) and VIM (Virtualised Infrastructure Manager) are (collaboratively or independently) deciding where to place a VNF. According to this, it becomes clear that for instance in case of a virtualized PGW the payload coming from the SGW needs to be forwarded via the underlying transport network into the cloud to the PGW and from there again back to the underlying transport network in order to reach the internet exchange point via SGi interface in order to get forwarded to the final application like for instance hosted by 'Amazon' or 'Google' and etc.

Here, it is to be noted that the traffic is duplicated to reach the PGW and to be fed into the internet exchange point. This increases the transport cost significantly, but which would not be the case if SDN architecture is applied although some control signaling overhead is induced by the separation of control and user plane. Today most vendors are very busy with implementing the NFV for their customers, SDN will be probably the next implementation step after or together with NFV, thus for a certain transition period both solution coexist.

According to 3GPP document TS23401, the MME selects the "legacy" SGW and PGW based on the "abstract geographic location" of eNB and S/PGW and the access point name APN signaled by the user equipment UE.

However, today 3GPP does not consider the interaction of legacy equipment with SDN and/or NFV equipment at all.

In order to optimize/minimize the cost of the operators network, according to exemplary version of the present invention, it is suggested to create a plurality of SGW, PGW eNB (legacy, virtualized or decomposed according to SDN principle) instances (depending on the expected traffic matrix as anticipated by the operator in question, but it can anyhow incrementally be changed as the traffic profile may change) in the DC via means of NFV according to ETSI.

It is to be noted that, even if some of the embodiments shown below focus on the Evolved Packet Core EPC architecture, the present invention is not limited thereto. Rather, the invention may be applied to architectures in which coexistence of Software Defined Network, Network Function Virtualization and legacy networks may occur as well.

In particular, as specific but non-limiting examples, the invention may also be utilised for the DSLAM (Digital Subscriber Line Access Multiplexer), CMTS (Cable Modem Termination System) and Broadband Remote Access Server BRAS (valid for fixed network and cable networks), session border controller SBC, wherein SBC (Session Border Controller) and BGF(Border Gateway Function)/BGW (Border Gateway Function) are part of IMS (IP Multimedia System), media gateway MGW, wherein MGW is part of the fixed network where the MGCF (Media Gateway Control Function) controls the user plane, etc. In general, IMS (with CSCF and etc.) has the same problem as the EPC.

That is, as a non-limiting example, the old MSC can be seen as a legacy node, which is separated into the MSS (MSC Server) and the MGW (Media Gateway). Not only in the EPC, but also in this area a selection process is required to select the best MGW (which carries the user payload) for a certain user for a certain service. The same is true for the IMS, where for instance the CSCFs (Call Session Control Function), which hosts the IMS control plane, can be collocated with the SBC, BGF or integrated In the following, one of possible implementations of the present invention is explained by means of specific embodiments of the present invention, which focuses on the EPC. However, as already indicated above, the present invention is not limited thereto.

Once the general infrastructure has been set up the whole network becomes operational and is ready for users attaching to the network.

Thereby, since in the network SDN, NFV and legacy equipment may coexist in parallel, the MME (as an example of a selection function for the serving gateway SGW and packet gateway PGW function) is in a difficult position to decide the optimized selection of gateways.

As the enB may or may not be virtualized, the 3GPP interface (S1AP S1-MME) between eNB and the MME is to be augmented with an new proprietary indication as to whether the eNB sending the "Attach request/Initial UE message" to the MME is virtualized or not and whether or not the SDN principle are applied to the eNB in question.

Alternatively the MME is made aware by other means (e.g. via the global orchestrator or the orchestrator of the NFV) what type of eNB (SDN, virtualized, or legacy) the signaling eNB is.

Preferably, not only the characteristic of the eNB is signaled/considered, but also the name/ID of the cloud where the virtualized eNB or the control plane of the eNB is located.

Thereby, it is to be noted that, preferably, said ID of the cloud or cloud ID shall be a global cloud ID, as it is of further advantage in the roaming case.

Further, it is to be noted that the eNB ID is carried in the EUTRAN Cell Global identity CGi. In the virtualized case, the eNB ID is not significant enough anymore as in case of the virtualized eNB the network function may reside inside a cloud.

Preferably, for instance the legacy eNB does not send the new information element, whereas the future virtualized eNB and/or the SDN based eNB-C shall send the new information element, such that the MME can determine the correct/best SGW and PGW, which again could be legacy GWs or virtualized ones or SDN based gateways. If the MME does not receive the new information element, it may assume that the eNB is a legacy eNB.

Interestingly, the MME may need to be informed about the geographic location of the virtualized eNB, which might be difficult as the corresponding virtualized network function theoretical can be placed anywhere, since this is one of the main advantages of virtualization as network function can be easily moved.

Again, the MME may be informed about the characteristics (legacy, virtualized or decomposed) of the available SGW and PGW (possibly for both the user and control plane) via the global orchestrator or via domain name system DNS means.

As described above, there is an additional penalty due to the consumption of extra transport capacity when the payload is transferred to the virtualized network function like the PGW, when being placed in the cloud in the NFV case.

However, in order to not multiply the drawback further, it is suggested that the MME takes care about the characteristic of the involved entities (here e.g. the originating eNB) when selecting the corresponding signaling partners such that, when the originating eNB is already virtualized according to ETSI NFV, a S/PGW is selected by the MME in the same cloud as the originating eNB.

This means, once one instance (e. g. the eNB) is in the cloud, it is beneficial to place or select the dependent signaling partner preferably in the same cloud in order to minimize the additional transport impact due the forwarding of payload traffic back and forth unnecessarily.

On the other hand, if the eNB is a legacy eNB or the eNB is decomposed into eNB-C and eNB-U, it is beneficial to not forward the user plane traffic at all into the cloud to a virtualized network function, but to keep the payload within a legacy S/PGW or decomposed GW on the S/PGW-U level in order to minimize the overall delay.

As a further optimization, according to certain embodiments of the present invention, the MME may select the SGW/PGW based on subscription information of the User in question to select an advantageous placement such that, if no extra needs like for parental control (which are said to be provided in the cloud) are to be supported preferably the user plane is to be kept outside the cloud intentionally, by selecting a legacy PGW or by selecting a decomposed PGW where the PGW-C is hosted in the cloud, but the U plane is located outside.

By that, payload traffic is actually only being forwarded to the cloud if there is anyhow a need for forwarding it to the cloud, thus healing the pain of extra traffic being sent up to the cloud and back again to the network to the minimum, thus not creating an avoidable and expensive bottleneck in the transport network and routing nodes.

Figure 3:
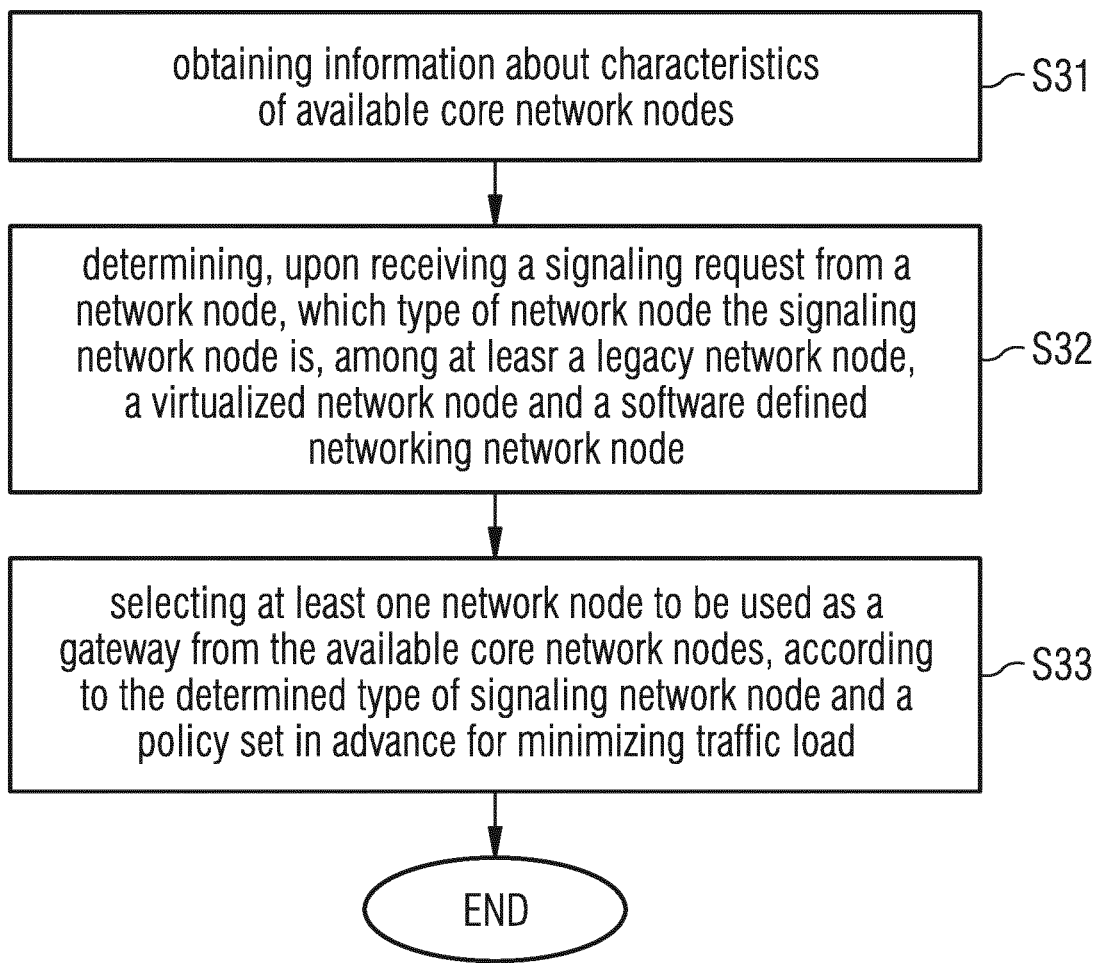
FIG. 3 illustrates a method performed in a network element comprising a core network selection function according to certain embodiments of the invention.

FIG. 3 shows a method according to some example versions of the disclosure, which may be performed in a mobility management entity.

In Step S31, information about characteristics of available core network nodes is obtained.

In Step S32, it is determined, upon receiving a signaling request from a network node, which type of network node the signaling network node is, among at least a legacy network node, a virtualized network node and a software defined networking network node.

Further, in Step S33, at least one network node to be used as a gateway is selected from the available core network nodes, according to the determined type of signaling network node and a policy set in advance for minimizing traffic load.

Thereby, it is to be noted that the steps S31 and S32 may be processed and/or performed in this order, or may be processed and/or performed in reverse order.

Figure 4:
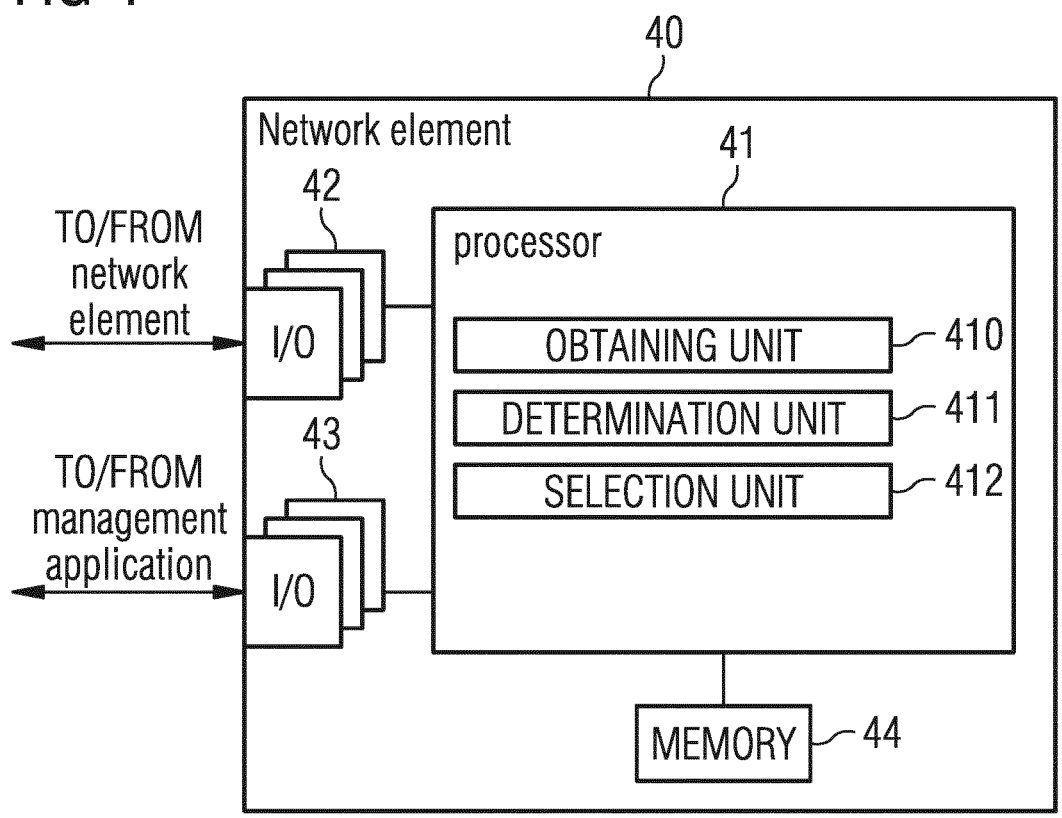
FIG. 4 depicts a general structure of an apparatus comprised in a network element comprising a core network selection function according to certain embodiments of the invention.

In FIG. 4, a diagram illustrating a configuration of an element comprised in a network element implementing a core network selection function, according to some example versions of the disclosure is shown, which is configured to implement improved coexistence of Software Defined Network SDN, Network Function Virtualization NFV, and legacy networks described in connection with some of the example versions of the disclosure. The embodiment may be carried out in or by the network element. It is to be noted that the network element may comprise elements or functions, such as a chipset, a chip, a module etc., which can also be part of a network element or attached as a separate element to a network element, or the like. It should be understood that each block and any combination thereof may be implemented by various means or their combinations, such as hardware, software, firmware, one or more processors and/or or circuitry.

The network element 40 shown in FIG. 4 may comprise a processing function, control unit or processor 41, such as a CPU or the like, which is suitable for executing instructions given by programs or the like related to the network element control procedure.

The processor 41 is configured to execute processing related to the above described improved coexistence of Software Defined Network SDN, Network Function Virtualization NFV, and legacy networks. In particular, the processor 41 comprises a sub-portion 410 as a obtaining unit configured to obtain information about characteristics of available core network nodes. The portion 410 may be configured to perform processing according to S31 of FIG. 3. Furthermore, the processor 41 comprises a sub-portion 411 usable as a determination unit configured to determine, upon receiving a signaling request from a network node, which type of network node the signaling network node is, among at least a legacy network node, a virtualized network node and a software defined networking network node. The portion 411 may be configured to perform processing according to S32 of FIG. 3. Furthermore, the processor 41 comprises a sub-portion 412 usable as a selection unit configured to select at least one network node to be used as a gateway from the available core network nodes, according to the determined type of signaling network node and a policy set in advance for minimizing traffic load. The portion 412 may be configured to perform processing according to S33 of FIG. 3.

Reference signs 42 and 43 denote transceiver or input/output (I/O) units (interfaces) connected to the processor 41. The I/O units 42 may be used for communicating with the network element. The I/O units 43 may be used for communicating with a management application. Reference sign 44 denotes a memory usable, for example, for storing data and programs to be executed by the processor 41 and/or as a working storage of the processor 41.

According to certain implementation examples regarding exemplary versions of the present invention, introduction of information elements indicating e.g. a legacy node, a full virtualized node, and a decomposed node may be provided for e.g. eNB, SGW, PGW, serving GPRS (General Packet Radio Service) support node SGSN Serving GPRS Support Node), gateway GPRS support node GGSN, Node B NB, mobile-services switching center MSC, etc.

The above information elements may also be utilized for Broadband Remote Access Server BRAS (valid for fixed network), session border controller SBC, wherein SBC and BGF/BGW are part of IMS, media gateway MGW, wherein MGW is part of the fixed network where the MGCF (Media Gateway Control Function) controls the user plane, etc.

Regarding introduction of an information element indicating the global ID of the cloud hosting network functions (for e.g. eNB, SGW, PGW, SGSN, GGSN, NB, MSC, etc), the global Cloud ID may consist of the Cloud Operator ID and Local ID of the cloud within the realm of the Cloud Operator ID With the introduction of the above information elements the MME is able to select e.g. location and/or the technology of the SGW/PGW, such that the underlying transport network and transport nodes (router switches) are not overutilized, but efficiently used, such that the needed transport capacity is minimized.

As mentioned above, the usage of a Global Cloud ID is helpful and beneficial to minimize latency and needed transport capacity when the roaming partner where for instance the SGW and the PGW are from different network operators. For instance by that the MME shall select that PGW of operator X and that SGW of operator Y which is hosted by the same cloud (because being able to know and to compare the Global Cloud ID) even in the roaming case by avoiding that the payload traffic of the eNB is forwarded to the cloud 34 of cloud operator A to reach the SGW of Telco Operator Y, and which then again needs to leave the cloud (e.g. No 34) of cloud operator A and to enter an intermediate transport network in order to enter the cloud (e.g. No. 25) of cloud operator B to reach the PGW of Telco Operator X. Finally the cloud 25 of cloud operator B hosting the PGW of Telco Operator X is to be left for the internet exchange point.

For that, it may be beneficial for all participating operators and vendors to exchange the location of the cloud where they are hosting their virtualized network functions by sharing the underlying global Cloud ID.

For similar reasons, in some cases it may also be beneficial when the user equipment may be able to directly chose or select an access node depending on its category/characteristics. Also the access nodes (base transceiver stations) in current and future radio networks ("eNB"—evolved NodeB) may be laid out as a legacy network element, as a virtualized network function (according to NFV) or as an element of the Software Defined Networking (SDN) architecture.

Figure 5:
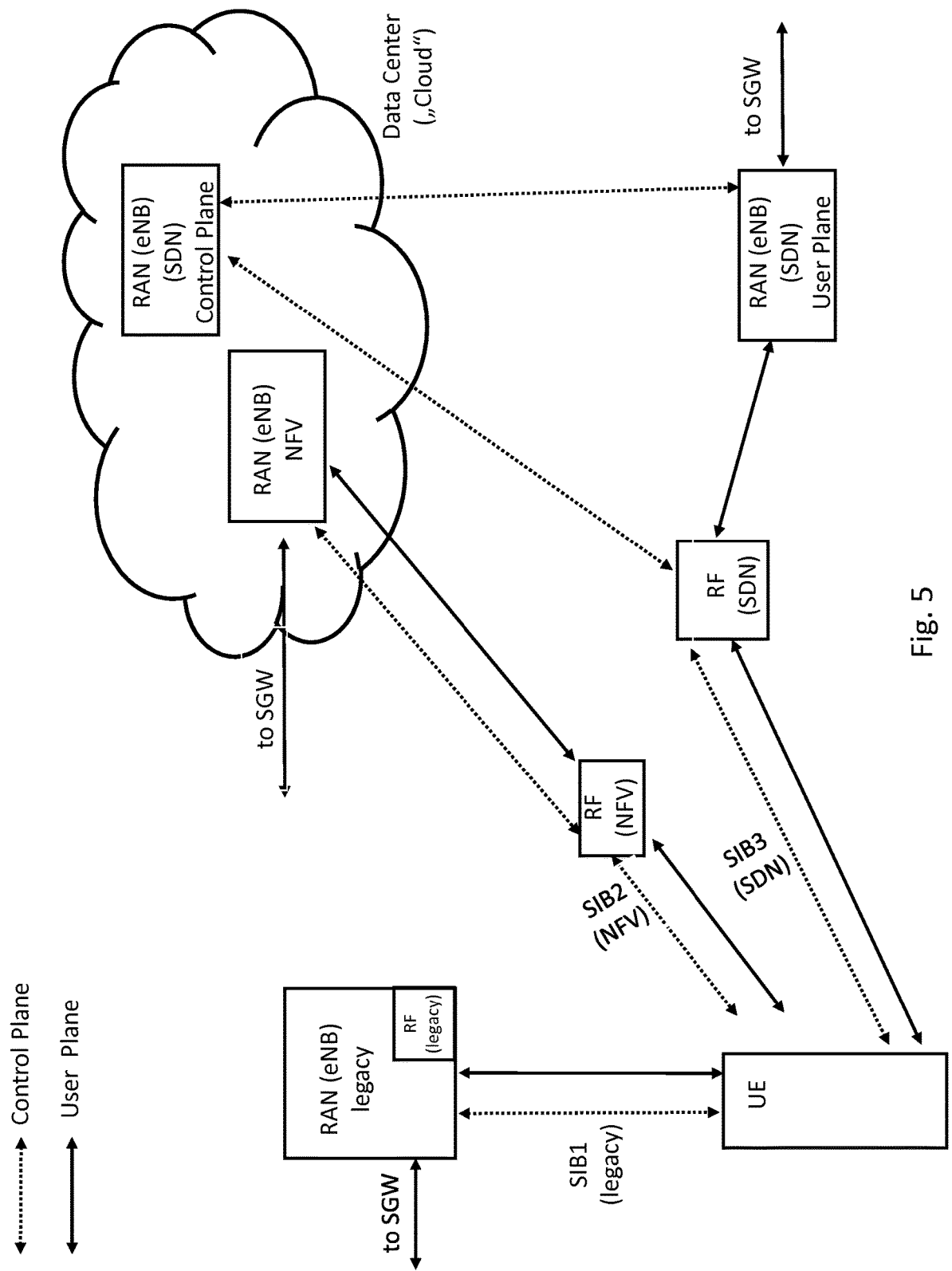
FIG. 5 shows an example of a user equipment being in contact with multiple base transceiver stations (eNB—evolved NodeB) having different characteristics and the respective traffic flows.

FIG. 5 shows an example where a user equipment (e.g. mobile device) is in the range of three access nodes (e.g. eNBs) having different characteristics. One eNB may be a legacy eNB, one eNB may be a NFV eNB (full virtualized eNB) and one eNB may be a decomposed eNB (SDN eNB).

All eNBs generally comprise an RF (Radio Frequency) part and a RAN (Radio Access Network) part. In the legacy case RF part and RAN part are usually comprised together within the same entity—no real differentiation between RF and RAN part is made. In the full virtualized case (NFV eNB) the RF part is independently located in the access area, whereas the RAN part is completely virtualized in a data center. For decomposed eNBs (SDN eNB) a further differentiation within the RAN part is made: a first RAN portion (for the control plane) is virtualized in a data center, whereas a second RAN portion (for the user plane) is independently designed. The RF part is, again, located independently in the access area.

As can be seen, for forwarding user plane traffic from the UE to a SGW, different routes are taken depending on the characteristic of the selected eNB: In case the legacy eNB is selected user data packets are conventionally transferred through the legacy eNB and forwarded to the SGW. In case the NFV eNB is selected all user data packets are transferred to the data center ("cloud") where the RAN part of the NVF eNB is located and then forwarded to the SGW. In case of the selection of the SDN eNB, the user data packets are, however, not transmitted via the data center, but directly sent from the RF part to the user plane RAN part of the SDN eNB, from where they are directly forwarded to the SGW. Thus, in the latter case user plane traffic is not sent via the data center, but a direct path or "shortcut" can be taken for user data packets on their way from the UE to the SGW.

As an aspect of the invention, the selection of an optimal eNB could be made based on the service the UE is requesting. The respective service, again, may be determined based on the APN (access point name) the UE tries to reach.

For example, when in a radio network a mobile device (UE) selects a PLMN (Public Land Mobile Network) several eNBs of the selected network may be in reach—see FIG. 5. The UE may then chose an eNB that is, based on its characteristic (SDN, NFV, legacy), best suited for the request service. If, for instance, a UE receives a SIB (System Information Block) from a legacy eNB, from a virtualized (NFV) eNB and/or from a SDN eNB, the UE may select the SDN eNB for delay sensitive services. With this, it can be ensured that, as explained above and according to the principles of SDN, only the control plane data will be forwarded to a data center (where the control plane RAN portion of the SDN eNB is located), and that the user plane data may directly be forwarded to, for example, an SGW.

In a further embodiment of the invention it may be preferable that the radio frequency (RF) part of an access node is involved in the process. For example, the RF part may have knowledge on the characteristics of the RAN part(s) (SDN, NFV, legacy) it is connected to.

As an example, the RF part may be connected to two kinds of eNB embodiments (e.g. NFV virtualized or decomposed eNB). In this case the RF part may detect the APN as signaled by the UE and, based on the signaled APN (or the respective service requested) select the optimal eNB. The dependency between APN (or service) and eNB to be selected may be predetermined and provided to the RF part by the operator.

Generally, certain rules could be provided by the operators as a certain "policy" describing the characteristic of an eNB that is to be selected depending on the APN a UE tries to reach. These rules could be provided by the operator beforehand and/or updated dynamically during operation.

In another aspect of the invention the eNB to which the UE connects or the respective MME (Mobile Management Entity—not shown in FIG. 5) involved in the connection management may redirect the UE to an eNB more appropriate for the requested service. For example, in case a UE connects to a first eNB (that has a non-optimal characteristic for a requested service) the eNB in question or the MME may redirect the UE's initial attach connection request to a second eNB (having a better suited characteristic).

For this, the eNB could use a "Detach reject/Downlink Nas Transport" message. The MME could, for example, use a "reroute command". In any case the UE would be forwarded to a specific further eNB (having a certain Cell ID) so that the requested service can be used with an improved routing of the (user) data packets.

Again, the rules for selecting the appropriate eNB may be provided to the eNB or the MME by the operator of the network, beforehand or during operation.

In the following an example is described how a network element, in this example the UE, could be informed on the characteristics of an eNB. For example, the eNB shall broadcast its characteristics (together with the Cell ID) in e.g. the SIB1 (Service Information Block 1 according to 3GPP TS 36.331) to all UEs. Then, any UE is able to distinguish between the different (characteristics of all) available eNBs. Thus, when selecting a cell (see 3GPP TS 36.304) the UE is enabled to select the preferred eNB additionally depending on the service it is requesting.

Below an example is provided for information elements that may be added to the conventional procedures.

The category or characteristic of an eNB could be indicated as:
"Legacy eNB"
"Full Virtualized eNB"
"Decomposed eNB"

An example for rules for the selection of the preferred eNB is shown in the following. A certain service refers to a certain eNB that is to be selected. Also, a different priority of the eNBs could be provided for cases where multiple eNBs having different characterizations are available. For example:
"Voice Service"->"Decomposed eNB/Legacy eNB/Full Virtualized eNB"
"Video Service"->"Decopmosed eNB/Legacy eNB"
"Game Service"->"Decopmosed eNB/Legacy eNB"
"M2M Service"->"Full Virtualized eNB/Decomposed eNB/"

Further rules for the selection of a preferred eNB could be provided for the default bearer, for example, or for any other services.

With the above rules it would be assured that in the case of a voice service the UE shall preferably select a decomposed eNB during initial attach or if PDN (packet data network) connectivity is requested (see 3GPP TS 23.401). In case no decomposed eNB is available a legacy eNB should be selected. If also no legacy eNB can be selected the UE shall select a full virtualized eNB.

However, if—as preferred—a decomposed eNB can be selected then, if the voice call stays within the operator's domain, the voice bearer needs not to be routed up to the data center. Rather, the user traffic may advantageously be kept on lower levels, thus minimizing the required transport capacity.

In the M2M (machine to machine) case on the other hand the selection of a full virtualized eNB would be the first choice. If no such eNB is available the UE should select a decomposed eNB according to the exemplary rules shown above.

If the above information elements are additionally configurable for the operator of the MME and/or the eNB it is furthermore possible that with theses information elements also the MME may be enabled to select e.g. an optimal SGW, as explained above.

In other words, it is to be noted that the information elements described above are referring to an eNB as a way of example only. The information elements may also be utilized for network elements like BRAS, SBC, BTS SGSN, GGSN, NB, MSC, HSS, HLR or any other network element. Accordingly, the inventive selection procedure of selecting a further network element depending on its characteristic (legacy, NFV, SDN) may be implemented in any network element that indeed somehow selects or connects to a further network element. In any case, it is then possible to always route data traffic via an optimal path, even if different network architecture concepts co-exist.

Generally, it is to be noted that embodiments of the present invention may be implemented as circuitry, in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It should also be understood that the above described example embodiments of the invention are not to be viewed in a limiting sense. Rather, there are several variations and modifications which may be made without departing from the scope of the present invention as defined in the appended claims.

The following meanings for the abbreviations used in this specification apply:

3GPP 3rd Generation Partnership Project
APN Access Point Name
BGCF Border Gateway Control Function
BRAS Broadband Remote Access Server
BTS Base Transceiver Station
CGi Cell Global identity
CSCF Call Session Control Function
DC Data Center
DNS domain name system
eNB evolved Node B (LTE Base Station)
EPC Evolved Packet Core
ETSI European Telecommunications Standards Institute
GGSN Gateway GPRS Supporting Node
GPRS General Packet Radio Service
GW Gateway
HLR Home Location Register
HSS Home Subscriber Server
I-BCF Interconnection Border Control Function
I-CSCF Interrogating CSCF
LTE Long Term Evolution
MGCF Media Gateway Control Function
MME Mobility Management Entity
MSC Mobile Switching Center
NB Node B
NFV Network Function Virtualization
OCS Online Charging System
OFCS Offline Charging System
P-CSCF Proxy-CSCF
PCRF Policy and Charging Rules Function
PDN Packet Data Network
PGW Packet Gateway
PLMN Public Land Mobile Network
RAN Radio Access Network
SBC Session Border Control
SDN Software Defined Networking
SGSN Serving GPRS Support Node
SGW Serving Gateway
SIB Service Information Block
TDF Traffic Detection Function
UE Use Equipment, i.e. mobile terminal
-C control plane (controller)
-U user plane

What is claimed is:

1. A method performed in a core network selection function, comprising:
    obtaining information about characteristics of available core network nodes;
    determining, upon receiving a signaling request from a network node, which type of network node the signaling network node is, wherein
        the type of network node comprises one of a legacy network node, a virtualized network node or a software defined networking network node; and
    selecting at least one network node to be used as a gateway from the available core network nodes, according to the determined type of signaling network node and a policy set in advance for minimizing traffic load, wherein
        in case the signaling network node is located at least partly in a cloud, selecting the at least one network node to be used as a gateway comprises selecting the at least one network node to be used as a gateway from the same cloud in order to minimize additional transport impact.

2. The method according to claim 1, wherein the characteristics of the available core network nodes comprise legacy type network nodes, virtualized type network nodes, and software defined networking based network nodes.

3. The method according to claim 1, wherein the signaling request comprises an information element indicating the type of the signaling network node, wherein the type of the signaling network node is determined based on the information element.

4. The method according to claim 3, wherein the information element comprises information regarding the geographic location of the signaling network node.

5. The method according to claim 1, wherein in case the signaling network node is of the virtualized type, information including the name/ID of the cloud where the virtualized signaling network node or the control plane of the signaling network node is located is provided by the signaling network node.

6. The method according to claim 1, wherein information regarding the type of signaling network node is provided via at least one of a global network orchestrator, the orchestrator of the network function virtualization, and a database.

7. The method according to claim 1, wherein in case the signaling network node is a legacy type network node or the signaling network node is decomposed into control plane and user plane, the user plane traffic is not transmitted into the cloud to a virtualized network function, but the payload is kept within a legacy type core network node or decomposed core network node on the network node user level.

8. The method according to claim 1, wherein the at least one network node to be used as gateway is selected based on subscription information of the user in question, by selecting a legacy type packet network node or by selecting a decomposed packet network node where the control plane is hosted in the cloud, but the user plane is located outside the cloud.

9. The method according to claim 1, wherein the signaling network node is a base station, the at least one selected network node acting as gateway is at least on of a serving gateway and packet gateway, and the core network selection function is performed in a mobility management entity.

10. A computer program product embodied on a non-transitory computer-readable medium, said product comprising code means for performing a method according to claim 1 when run on a processing means or module.

11. An apparatus including a core network selection function, comprising:
- at least one processor, and
- at least one memory for storing instructions to be executed by the processor,
- wherein the at least one memory and the instructions are configured to, with the at least one processor, cause the apparatus at least to perform:
- obtaining information about characteristics of available core network nodes;
- determining, upon receiving a signaling request from a network node, which type of network node the signaling network node is, wherein
  - the type of network node comprises one of a legacy network node, a virtualized network node a software defined networking network node; and
- selecting at least one network node to be used as a gateway from the available core network nodes, according to the determined type of signaling network node and a policy set in advance for minimizing traffic load, wherein
  - in case the signaling network node is located at least partly in a cloud, selecting the at least one network node to be used as a gateway comprises selecting the at least one network node to be used as a gateway from the same cloud in order to minimize the additional transport impact.

12. The apparatus according to claim 11, wherein the characteristics of the available core network nodes comprise legacy type network nodes, virtualized type network nodes, and software defined networking based network nodes.

13. The apparatus according to claim 11, wherein the signaling request comprises an information element indicating the type of the signaling network node, wherein the type of the signaling network node is determined based on the information element.

14. The apparatus according to claim 13, wherein the information element comprises information regarding the geographic location of the signaling network node.

15. The apparatus according to claim 11, wherein in case the signaling network node is of the virtualized type, information including the name/ID of the cloud where the virtualized signaling network node or the control plane of the signaling network node is located is provided by the signaling network node.

16. The apparatus according to claim 11, wherein information regarding the type of signaling network node is provided via at least one of a global network orchestrator, the orchestrator of the network function virtualization, and a database.

17. The apparatus according to claim 11, wherein in case the signaling network node is a legacy type network node or the signaling network node is decomposed into control plane and user plane, the user plane traffic is not transmitted into the cloud to a virtualized network function, but the payload is kept within a legacy type core network node or decomposed core network node on the network node user level.

18. The apparatus according to claim 11, wherein the at least one network node to be used as gateway is selected based on subscription information of the user in question, by selecting a legacy type packet network node or by selecting a decomposed packet network node where the control plane is hosted in the cloud, but the user plane is located outside the cloud.

19. The apparatus according to claim 11, wherein the signaling network node is a base station, the at least one selected network node acting as gateway is at least on of a serving gateway and packet gateway, and the core network selection function is performed in a mobility management entity.

* * * * *